US009275003B1

(12) United States Patent
Hemmert et al.

(10) Patent No.: US 9,275,003 B1
(45) Date of Patent: Mar. 1, 2016

(54) NIC ATOMIC OPERATION UNIT WITH CACHING AND BANDWIDTH MITIGATION

(75) Inventors: Karl Scott Hemmert, Albuquerque, NM (US); Keith D. Underwood, Albuquerque, NM (US); Michael J. Levenhagen, Albuquerque, NM (US)

(73) Assignee: Sandia Corporation, Albuquerque, NM (US)

(*) Notice: Subject to any disclaimer, the term of this patent is extended or adjusted under 35 U.S.C. 154(b) by 1651 days.

(21) Appl. No.: 12/243,756

(22) Filed: Oct. 1, 2008

Related U.S. Application Data

(60) Provisional application No. 60/976,970, filed on Oct. 2, 2007.

(51) Int. Cl.
  *G06F 15/16* (2006.01)
  *G06F 15/173* (2006.01)
  *G06F 12/08* (2006.01)

(52) U.S. Cl.
  CPC ........ *G06F 15/1735* (2013.01); *G06F 12/0868* (2013.01); *G06F 12/0815* (2013.01); *G06F 2212/603* (2013.01)

(58) Field of Classification Search
  CPC ............ G06F 12/0815; G06F 12/0868; G06F 2212/603; G06F 2212/45; G06F 2212/27; G06F 2212/60; G06F 15/1735
  See application file for complete search history.

(56) References Cited

U.S. PATENT DOCUMENTS

| 4,538,226 | A  | * | 8/1985 | Hori ............................... 711/3 |
| 5,613,071 | A  | * | 3/1997 | Rankin ............... G06F 12/0284 |
| 2004/0024971 | A1 | * | 2/2004 | Bogin et al. ................... 711/135 |
| 2004/0139262 | A1 | * | 7/2004 | Beaudoin et al. ............. 710/305 |
| 2007/0067497 | A1 | * | 3/2007 | Craft et al. ..................... 709/250 |
| 2007/0156960 | A1 | * | 7/2007 | Vasudevan ........... G06F 12/0888 711/118 |
| 2007/0239938 | A1 | * | 10/2007 | Pong ............................. 711/122 |
| 2007/0255907 | A1 | * | 11/2007 | Zeffer et al. ................... 711/141 |
| 2008/0104329 | A1 | * | 5/2008 | Gaither et al. ................ 711/138 |
| 2008/0140934 | A1 | * | 6/2008 | Luick ............................ 711/117 |
| 2008/0243992 | A1 | * | 10/2008 | Jardetzky ........... G06F 17/30067 709/203 |

OTHER PUBLICATIONS

Beecroft, J. et al., "Meiko CS-2 Interconnect Elan-Elite Design", Parallel Computing, 20(1011), 1994, pp. 1627-1638.
Buntinas, D. et al., "NIC-based Reduction in Myrinet Clusters: Is it Beneficial?". Proceedings of the SAN-02 Workshop, Feb. 2002.
Cray Research, Inc., "SHMEM Technical Note for C, SG-2515 2.3", Oct. 1994.
Moody, A. et al., "Scalable NIC-based Reduction on Large-Scale Clusters", Proceedings of the ACM / IEEE SC2003 Conference, Nov. 2003.
Petrini, F. et al., "The Quadrics Netwwork: High-Performance Clustering Technology", IEEE Micro, 22(1), Jan. 2002 , pp. 46-57.

(Continued)

*Primary Examiner* — Tom Y Chang
(74) *Attorney, Agent, or Firm* — Madelynne J. Farber (57) ABSTRACT

A network interface controller atomic operation unit and a network interface control method comprising, in an atomic operation unit of a network interface controller, using a write-through cache and employing a rate-limiting functional unit.

18 Claims, 4 Drawing Sheets

(56) References Cited

OTHER PUBLICATIONS

Scott, S. L., "Synchronization and Communication in the T3E Multiprocessor", Seventh ACM International Conference of Architectural Support for Programming Languages and Operating Systems, Oct. 1996.

Underwood, Keith D. et al., "High Message Rate, NIC-Based Atomics: Design and Performance Considerations", IEEE Cluster, Sep. 2008.

* cited by examiner

NIC ATOMIC OPERATION UNIT WITH CACHING AND BANDWIDTH MITIGATION

CROSS-REFERENCE TO RELATED APPLICATIONS

This application claims priority to and the benefit of the filing of U.S. Provisional Patent Application Ser. No. 60/976,970, entitled "A NIC Atomic Operation Unit with Caching and Bandwidth Mitigation", filed on Oct. 2, 2007, and the specification and claims thereof are incorporated herein by reference.

STATEMENT REGARDING FEDERALLY SPONSORED RESEARCH OR DEVELOPMENT

The Government has rights to this invention pursuant to Contract No. DE-AC04-94AL85000 awarded by the U.S. Department of Energy.

INCORPORATION BY REFERENCE OF MATERIAL SUBMITTED ON A COMPACT DISC

Not Applicable.

COPYRIGHTED MATERIAL

Not Applicable.

BACKGROUND OF THE INVENTION

1. Field of the Invention (Technical Field)

The present invention relates to atomic operation units (AOUs) for network interface controllers (NICs).

2. Description of Related Art

Note that the following discussion refers to a number of publications by author(s) and year of publication, and that due to recent publication dates certain publications are not to be considered as prior art vis-a-vis the present invention. Discussion of such publications herein is given for more complete background and is not to be construed as an admission that such publications are prior art for patentability determination purposes.

A key capability for parallel computers, particularly those supporting partitioned global address space (PGAS) programming models, is the ability to efficiently support remote atomic operations. A common usage model for remote atomic operations is to have many nodes access a small number of variables on a given target node. A unit capable of performing atomic operations is sometimes provided on the network interface along with a local cache of data. The local cache on the network interface controller (NIC) poses a set of challenges regarding the frequency with which items are propagated to the node's primary memory. The present invention provides a mechanism for managing this cache along with mechanisms to reduce data traffic to the host processor.

Atomic operations have been supported on the network interface for quite some time with the restriction that the data item only be modified through a specific Application Programming Interface (API). For example, the Quadrics Elan network adapters, J. Beecroft, et al., "Meiko CS-2 interconnect Elan-Elite design", Parallel Computing, 20(1011):1627-1638 (1994); and F. Petrini, et al., "The Quadrics network: High-performance clustering technology", IEEE Micro, 22(1):46-57 (January 2002), support SHMEM, Cray Research, Inc., SHMEM Technical Note for C, SG-2516 2.3 (October 1994), perform atomic operations using an Elan thread. A similar scheme was provided on the Cray T3E, S. L. Scott, "Synchronization and communication in the T3E multiprocessor", Seventh ACM International Conference on Architectural Support for Programming Languages and Operating Systems (October 1996), but was provided at the memory controller, where it is easier to guarantee ordering semantics, is always visible to the processor, and does not consume system bus bandwidth to flush an item. While placing the operations at the memory controller is quite appealing technically, it is generally less feasible in modern system implementations where the memory controller is part of the host processor chip.

Upcoming networks by supercomputer vendors may support SHMEM style atomics with an atomic unit on the network interface along with a local cache. However, none of these adapters are believed to include a write-through cache or a local tracking of outstanding items evicted from the local cache. More importantly, these designs likely use time-outs to mitigate the amount of traffic placed on the interconnect to the host processor rather than a more flexible rate absorbing mechanism.

Collective operations are closely related to atomic operations and have been studied on programmable network interfaces (e.g., D. Buntinas, et al., "NIC-based reduction in Myrinet clusters: Is it beneficial?", Proceedings of the SAN-02 Workshop (February 2002); A. Moody, et al., "Scalable NIC-based reduction on large-scale clusters", Proceedings of the ACM/IEEE SC2003 Conference (November 2003); however, collectives are fundamentally different in the way they accept data and provide results.

Previous designs have attempted to implement atomic operations on the network interface using a local cache. One of the fundamental problems, however, is that the access mechanisms for variables touched by the atomic operations are sub-optimal. In general, previous designs have used a time-out to manage the local cache. This time-out allows the cache to update the host memory after a predefined interval, but brings a certain set of constraints on performance. For example, one usage of atomic operations is to allow the local host to track "completion events". These events can be signaled by atomically incrementing a variable, with the host waiting for a certain value of the variable to be reached before proceeding. "Waiting" typically consists of polling the location of the atomic element in host memory and having that value be updated as quickly as possible. It is generally desirable to relax these constraints by increasing the frequency with which updates are written to host memory; however, doing so could easily overwhelm the link between the network interface and the host processor.

The fundamental limitation associated with time-outs for moving data from NIC cache to host memory is the specific time-out value that is chosen. If the time-out value is too large, a significant performance penalty is incurred because the host has to wait for an extended period of time to determine that the value has been updated. If the time-out value is too small, it loses its impact because it no longer reduces traffic to the host.

At this point, it is useful to consider traffic models for atomic operations. There are three basic points in the spectrum to consider. The first is a light traffic model, where some number of locations are modified atomically "occasionally". Virtually any atomic unit is sufficient for this class of operation as it happens seldom enough to have minimal impact on performance. The second is "global random access" traffic as might be seen in the GUPS (Giga-Updates per Second) benchmark. In this case, regardless of access rate, caches have no value as the operation never hits cache. These cases require that the functional unit and cache operate efficiently in high miss rate scenarios. The third case, and interesting case for the discussion of bandwidth mitigation, is one where a small number of variables are heavily accessed through atomic operations at a given node. This type of access occurs frequently when managing locks or structures such as shared queues. What is unique about the third case is that it can generate a large amount of traffic to the host memory that can be mitigated by caching on the network interface.

The mechanism provided by the present invention uses a write-through cache combined with traffic mitigation at both the atomic unit as well as the queue between the atomic unit and the host processor. It also provides appropriate mechanisms for tracking "in flight" operations as necessary. Together, these optimizations significantly enhance performance for atomic operations.

BRIEF SUMMARY OF THE INVENTION

The present invention is of a network interface controller atomic operation unit and a network interface control method comprising, in an atomic operation unit of a network interface controller, using a write-through cache and employing a rate-limiting functional unit. In the preferred embodiment, one or more of the following elements are employed. The rate-limiting functional unit employs an issue unit reviewing a look-ahead window of network requests, an arithmetic logical unit receiving requests from the issue unit, and a register file in two-way communication with the arithmetic logical unit. The issue unit comprises an in-flight queue. A rate-absorbing queue is used between the cache and a host processor, which may employ a plurality of associative memory cells each comprising a valid bit. A queue can be employed receiving read requests from the cache, and wherein write requests from the cache are provided to the rate-absorbing queue. A buffer may be located between the cache and the queues, such as between the cache and the host processor, and wherein the buffer makes flush requests to a local bus interface unit of the host processor.

Further scope of applicability of the present invention will be set forth in part in the detailed description to follow, taken in conjunction with the accompanying drawings, and in part will become apparent to those skilled in the art upon examination of the following, or may be learned by practice of the invention. The objects and advantages of the invention may be realized and attained by means of the instrumentalities and combinations particularly pointed out in the appended claims.

BRIEF DESCRIPTION OF THE SEVERAL
VIEWS OF THE DRAWINGS

The accompanying drawings, which are incorporated into and form a part of the specification, illustrate one or more embodiments of the present invention and, together with the description, serve to explain the principles of the invention. The drawings are only for the purpose of illustrating one or more preferred embodiments of the invention and are not to be construed as limiting the invention. In the drawings.

DETAILED DESCRIPTION OF THE INVENTION

The present invention is of an apparatus and method for handling atomic operations within a network interface controller (NIC). Such a device is referred to herein interchangeably as an atomic unit and as an atomic operation unit.

Implications of Traffic Model.

The network traffic model of interest for the present invention is one in which numerous nodes heavily access a (relatively) small set of addresses on a given target node. This model typically benefits from caching, but has a number of subtleties that are relevant to the discussion.

Generating Too Much Host Traffic.

The link from the NIC to the host processor is often constrained relative to the link bandwidth within the network: thus, it is possible for a NIC to generate more traffic than a host link can absorb. This causes queues to form on the NIC and results in queuing delay. Even if the network links have slightly less bandwidth than the link to the host processor, the network is contending with the host processor for access to memory. This can still lead to queuing delay on the network interface if too much traffic is generated to the host processor.

Interaction with Conventional Caching.

With a simple write-back cache on the NIC, the small number of target addresses are held on the NIC after one access to the host per variable. The cache is always hit and the values are never flushed back to the host. This makes it impossible for the host processor to ever "see" atomic values that have been generated on the NIC. Most Partitioned Global Address Space (PGAS) models do not want to have to flush the cache on the NIC before accessing one of the variables. This is particularly relevant to completion event types of semantics. To address this problem, the NIC can implement a scheme to flush values from the NIC after a delay since the last update to that location. The assumption is that after "some amount of time" the NIC decides that no more activity is likely to happen targeting that location in the near future.

Although used in some modern systems, this approach is unstable under increased load. If the queue between the atomic unit and the host processor is full, it causes operations to stall back into the network. Such stalls increase the time between operations and cause more time-outs to trigger; thus, more load is introduced onto the link to the host at exactly the time when load is highest.

Interaction with Write-Through Caching.

The alternative provided by the present invention is to use a write-through cache. In this scenario, every write to the cache is also written to the corresponding location in the host processor's memory. Without another form of mitigation, the load is always high on the link to the host processor and causes queuing delays from the processor link back into the network. A significant contribution here is a mechanism to reduce the load on the host link when using a write-through cache.

Preferred Hardware of the Invention.

Figure 1:
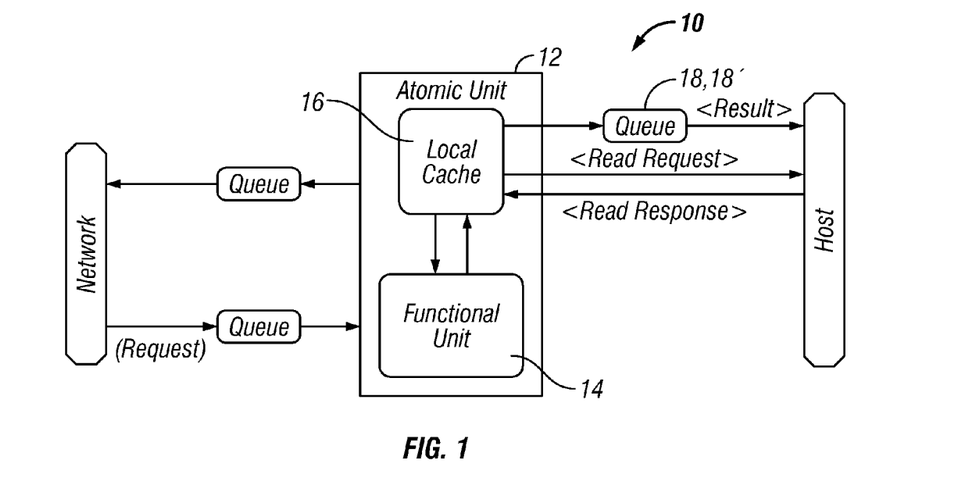
FIG. 1 is a block diagram of the preferred atomic unit of the present invention.

FIG. 1 presents the overall block diagram of the atomic unit 12 in the context of the present invention 10. The atomic unit receives requests for atomic operations from the network (see below for a discussion of usage issues in this context, including addressing issues). The functional unit 14 makes a request of the local cache 16 for a data value to update. If the request misses the cache, the cache requests the data from the host, optionally via one or more queues 18,18'. The functional unit updates the value and writes the result back to the local cache. If the atomic operation requests it, the value is also returned over the network to the requester.

Write-Through Cache.

The cache in FIG. 1 is configured in write-through mode. That is, every value written to the cache from the functional unit is propagated up to the corresponding location in host memory. This eliminates the issue of calibrating a time-out value, which would vary depending on network conditions and access patterns. It also provides immediate updates to the host to improve performance. In addition, it makes sure that memory traffic associated with a particular atomic operation occurs at the time of that atomic operation instead of when the value is flushed because of a cache overflow. With all of its benefits, the write-through configuration of the cache does introduce a challenge in terms of additional bandwidth requirements on the host. Two approaches to limiting this impact are described next.

Rate Limiting Functional Unit.

If the network interface becomes bandwidth constrained, a queue of operations will build at the input to the functional unit. Frequently, there is a small number of target addresses (e.g., locks) used for atomic operations. A configurable time-out on the cache (as done in previous work) leverages this fact to condense multiple transactions to the host into a single transaction. In explanation, if two atomic operations to a given target address arrive within a given window of time, both occur to the cache and only the cumulative result is written to the host. This is generalized such that if the interval between two operations is never greater than the time-out, the result is never written to the host. Switching to a write-through cache changes the policy for writing results up to the host, but does not change the network access pattern. The functional unit can still leverage this access pattern.

To discuss how the functional unit can limit traffic to the host, it is first useful to discuss the organization of the functional unit. A functional unit according to the invention preferably separates the requests to the cache from the operation itself (see FIG. 2). Thus, the issue unit 52 translates operations into a queue of cache requests which cause the cache to generate a queue of values back to the issue unit. Once the data is available, the request can be issued to the arithmetic logical unit (ALU) 54. This arrangement opens up many possibilities for limiting the rate at which data is written back to the cache, and therefore to the host.

Figure 2:
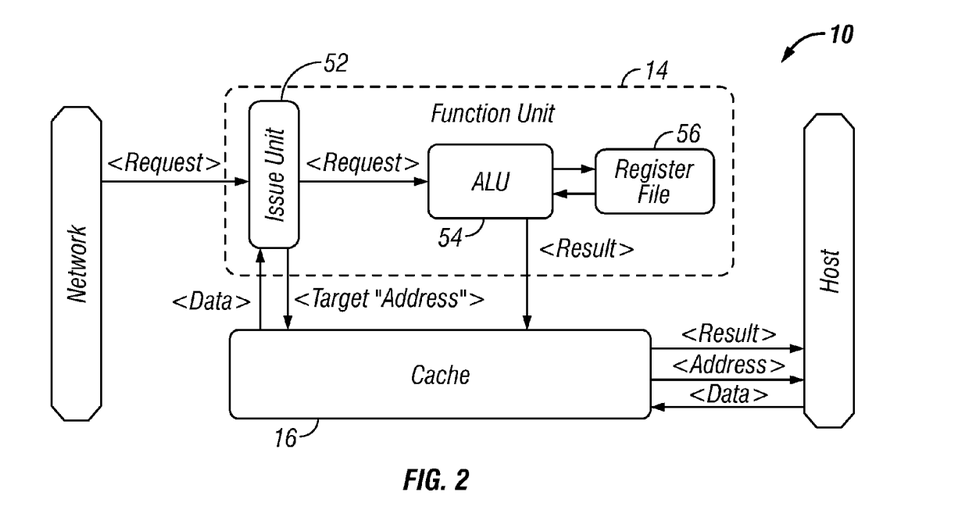
FIG. 2 is a block diagram of the preferred rate limiting functional unit of the invention.

To limit the rate at which data is written to the host, three resources are needed: First, the issue unit can be provisioned with logic to look at a window of requests (referred to as the look-ahead window) which have backed up at the input to the atomic unit. Second, a small register file 56 is needed to hold intermediate values. Third, a method for tracking which cache entries are busy is needed. A cache entry is considered busy if it has been read for use in an operation, but not yet had a result written back to it.

These structures are used to execute several operations which target the same address and arrive in close proximity before they are written back to the cache (and therefore to the host). The locations in the register file can be used as sources and targets for the incoming requests. A write to the register file would be made if an operation in the look-ahead window targeted the same final address as the current operation. This would delay the write to the cache. The next instruction targeting the same address would then use the temporary register as a source and write the result back to the cache, thus causing a write to the host. Once an instruction is issued, it cannot be changed, therefore, the tracking of busy cache entries becomes necessary. If an instruction to be issued targets the same address as an already issued operation which was not rewritten to use the register file (i.e., targets a busy cache entry), the issue unit (or cache input) must block until the prior operation writes back to the cache. It is also be possible to use a set-aside buffer for such operations in order to allow ready operations to proceed.

Different "aging" policies can be used to determine how long a value could be reused from the register file before being written from the cache. One aging policy could simply be that an operation is not permitted to read and write values in the register file. In effect, this would mean that two operations could be turned into a single write to cache. Generally, a count could be kept of the number of times the value was reused and write back to the cache after a specified count is reached. A third possibility is to give the functional unit access to the status of the queue to the host. If the queue to the host is empty, then the issue unit will instruct the ALU to write the result back to the cache to generate a write to the host. If the queue to the host is not empty, the value would not propagate to memory anyway, so nothing is lost by continuing to suppress the writes to the host. It is also possible to provide a policy which is a combination of these. In all cases, a result is written to the cache if no other instruction in the look-ahead window targets the same address.

This approach fundamentally differs from a time-out in that it simply provides a view into queued operations whereas a time-out is designed to look much further into the future. The reliance on only queued operations recognizes that there is only a measurable bandwidth constriction if there is a queue of operations at the input to the functional unit.

Rate Absorbing Queue.

The embodiments described in the previous section leave open the possibility of a series of accesses that target alternating addresses. This would prevent the issue unit from using the result of the prior operation and eliminate the ability to reduce bandwidth requirements. In this scenario, a rate absorbing queue 18' can be used.

The principle here is based on the traffic scenario described above: traffic from the write-through cache is overwhelming the link to the processor (or is arbitrating for access to the processor's memory controller) and causing queuing delays. Because the queue between the atomic unit and the link to the host is not constrained in size like the look-ahead of the cache, it will typically be implemented to be significantly bigger to deal with bursty network traffic and bursty service from the processor link.

Figure 3A:
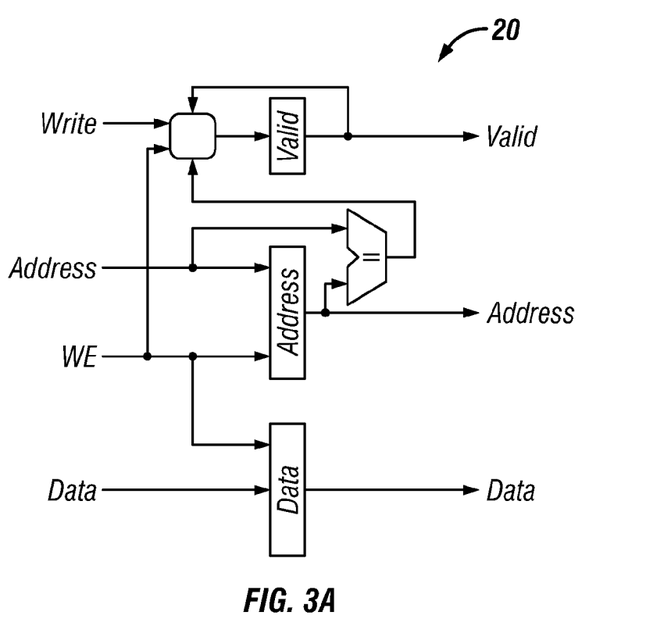
FIG. 3A is a block diagram of the preferred associative memory cell (AMC) of the invention.

The rate absorbing queue of the invention preferably acts as a normal queue with one exception: each memory location in the queue is replaced with an associative memory cell (AMC) 20. A block diagram of the AMC is shown in FIG. 3A. The AMC differs from a typical memory cell in that it has knowledge of what data is stored in the cell. This information is used to detect when a newly inserted entry is writing data to the same host address (through the use of the equals operation shown in the figure). When this occurs, the old entry is invalidated, allowing only the latest update to be written to the host memory. The valid state of the cell is tracked by setting the valid bit to one when data is written to the FIFO (First-In First-Out queue) and setting it to zero if it is invalidated.

Figure 3B:
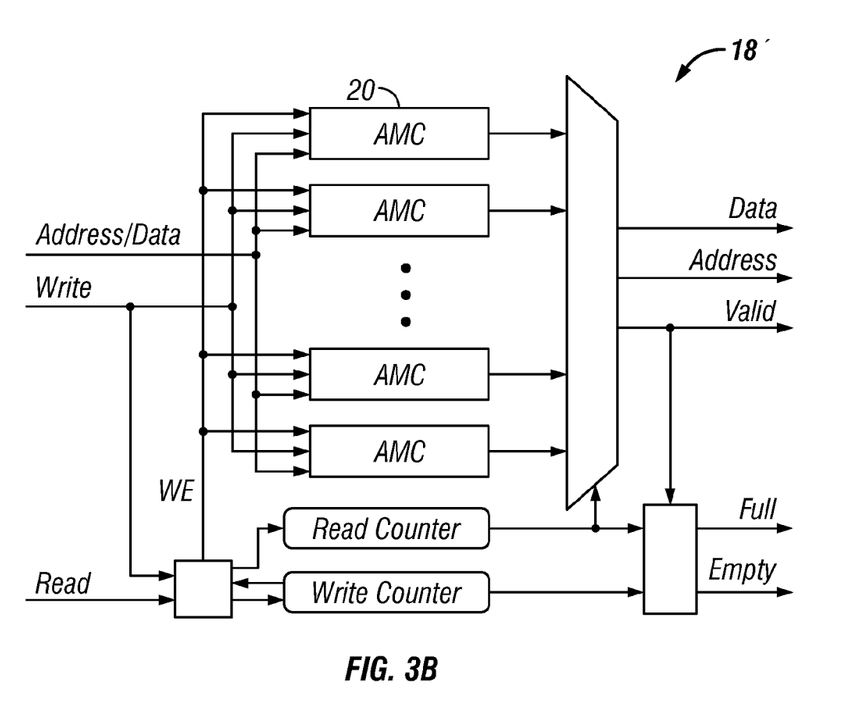
FIG. 3B is a block diagram of the preferred rate absorbing queue of the invention.

A block diagram of the preferred rate absorbing FIFO is shown in FIG. 3B. The inclusion of the valid bit requires a slight modification from typical queue operation: when the head of the queue is an invalidated entry, the queue must report that it is empty so that external blocks will not try to read data. This means that each invalidated entry requires a "dead" cycle to clear it from the head of the queue. This is acceptable because the situation will only arise when there is congestion on the link to the host.

Resolving Read-after-Write (RAW) Hazards.

In many systems, a cache for the atomic unit on the network interface may create a read-after-write (RAW) hazard. Specifically, the sequence: (1) perform an atomic operation on address A; (2) write the result to host memory at address A; (3) evict address A from the cache; and (4) perform a second atomic operation on address A. Step 4 in this sequence will cause a host memory read after the host memory write from step 3. If those operations are temporally close, it is possible (even likely) for the read access to pass the previous read. This can easily occur with pipelined I/O interfaces that do not guarantee ordering of requests.

Figure 4:
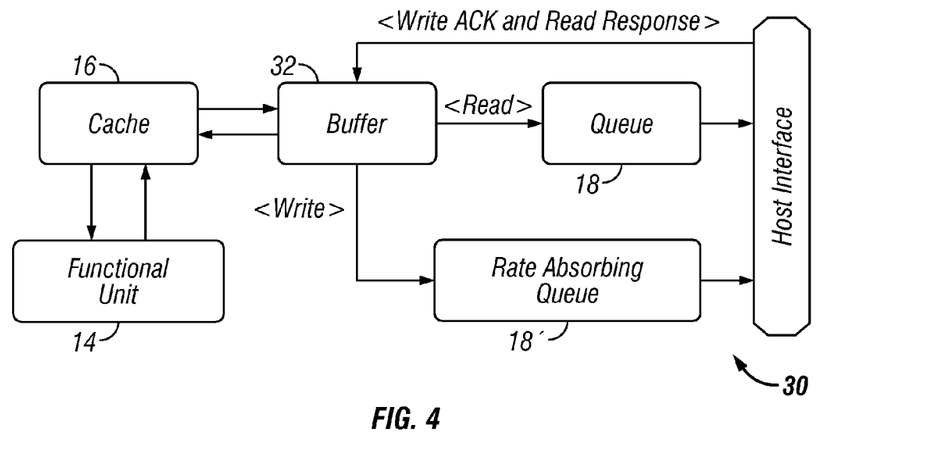
FIG. 4 is a block diagram of the preferred placement of a secondary buffer when tracking writes according to the invention.

The solution to this problem involves a unit 32, 42 to buffer writes until they have completed to host memory. This buffer works as a secondary cache structure. There are two ways to manage this secondary buffer. The first, shown in FIG. 4, is to require that the interface to the host bus return an acknowledgment when the write request has completed to a level of hierarchy that preserves request ordering. When a write is initiated to host memory, a copy of the address/value pair is written to this buffer. When that write completes to a level of the system memory hierarchy where request ordering is preserved, the corresponding item is deleted from the buffer. Items that miss the cache must check the buffer first before reading from host memory. If the corresponding item is found in this secondary buffer, the read request is serviced from the secondary buffer. Otherwise, the read request is passed on to the host processor. This approach quickly purges items from the secondary buffer and minimizes the required buffer size. On some host interface links, this is the best approach as the local bus interface unit can provide this information easily. On other links, this could be unduly complicated if that response would have to come from the host memory controller itself.

Figure 5:
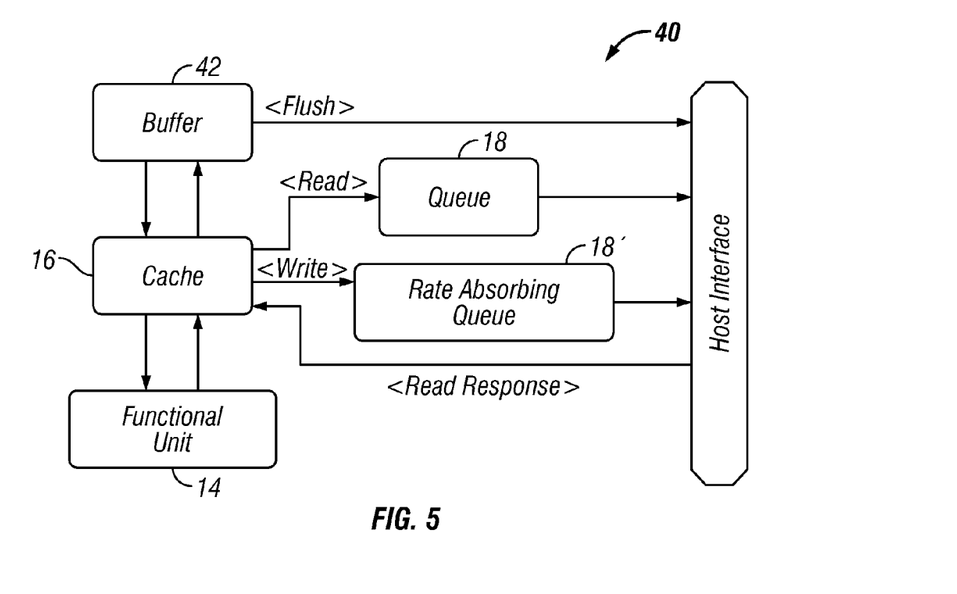
FIG. 5 is a block diagram of the preferred buffer operation for bus flushing according to the invention.

The second alternative, shown in FIG. 5, is to request a flush from the local bus interface unit (this is available on most interfaces). This flush would only return when all outstanding requests had completed. In this scenario, it is not possible to locally track when individual writes complete; thus, only evicted items are placed in this buffer, even though evicted items are not written to the host when they are evicted. While an evicted item may not have been recently written to host memory, it is impossible to track that information so all evictions are written to the buffer. Only evictions are written to the buffer because evictions are typically less frequent than writes (and never more frequent than writes). The flush guarantees that it is safe to proceed and that all previous writes that could have been associated with an evicted value have completed. This approach makes it desirable to have a much larger secondary buffer than strictly needed to maximize performance. The issue is that a flush call is typically an expensive operation; thus, the frequency of flush calls should be minimized. The flush is only called when the entire secondary buffer is full and would allow the entire secondary buffer to be invalidated at once.

Pipelining.

To sustain high performance under certain workloads, it is critical that the functional unit and cache be pipelined to maintain a sufficient number of outstanding accesses to host memory to cover the round-trip latency. Details of mechanisms to achieve this vary depending on the organization of the atomic functional unit, but the principles remain the same.

Figure 6:
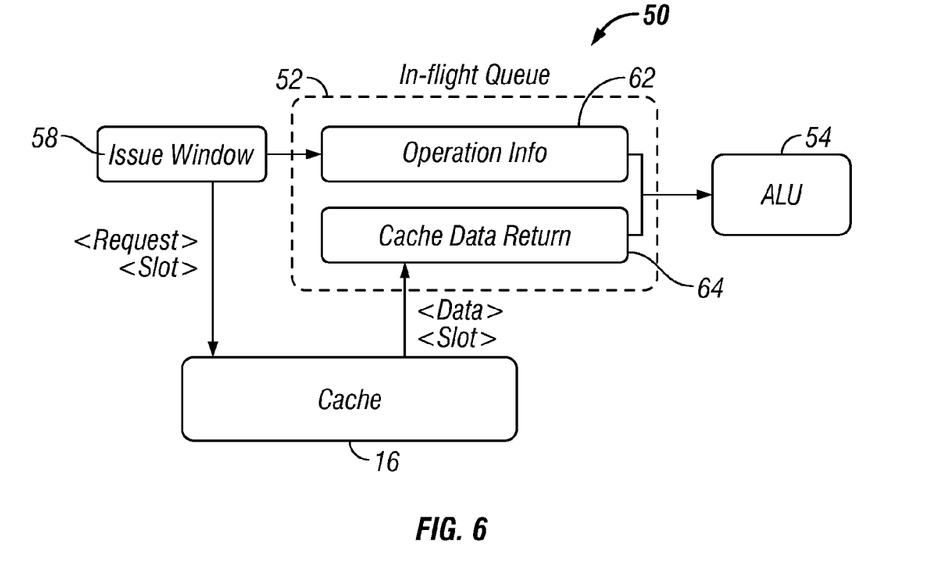
FIG. 6 is a block diagram of the preferred organization of the in-flight queue according to the invention, which allows a large number of outstanding reads to host memory.

Fundamentally, pipelining of accesses to the host begins with the functional unit providing a stream of address requests to the cache (e.g., FIG. 2, but other organizations are possible). When a cache miss is encountered, the cache must forward the request to the host interface and attempt to service the next request. The logic in the issue unit allows the results from cache to be returned out-of-order, making it possible for processing to continue on operands which hit in the cache. This is important to allowing enough host requests to be in-flight in the case where cache hits and misses are interspersed. This is accomplished 50 with a special purpose "in-flight" queue 52 in the issue unit. The organization of the queue is shown in FIG. 6. Information received from the network (address, operand, operation, etc.) is put into the top path 62 in the figure, while the bottom path is used to receive the data from the cache. When a cache request is made, the issue unit 58 passes the slot number in the queue to the cache as an identifier. The returned data is put into the appropriate slot 64 when it is available, so cache requests can be received out-of-order. However, the instructions issue in-order to the functional unit; if the operation at the head of the queue is not yet ready (has not received data from the cache), then the operation blocks. Note that operations which were rewritten to receive their data from the register file do not issue requests to the cache. The number of allowable outstanding reads to host memory is determined by the length of this queue.

Out-of-order completion can introduce another potential problem: read-after-write (RAW) hazards. RAW hazards arise when multiple operations arrive in close temporal proximity and target the same address (or, multiple addresses in one cache line). For the first operation, the cache initiates a read to host memory. If the second operation arrives before the first read is serviced, the issue unit must recognize that the second operation should not be initiated, but instead should be held until the result of the first operation is available. This can be accomplished though the use of the in-flight operation tracking. The easiest solution is to block the request queue at this point; however, it would also be possible to have a small buffer at the issue unit to "set aside" items that would block the queue and allow items behind it to proceed. Since this should be a relatively rare occurrence, this buffer can be small. This is the same requirement when using the register file as a rate limiter, so the same hardware can serve both uses.

In addition, in the specific organization shown in FIG. 2, even in cache hit scenarios, back-to-back operations to the same location must be separated by the latency of the functional unit to insure that the second operation operates on the result of the first operation. This can be accomplished either by blocking, or by having reservation stations in the functional unit which can reorder instructions to keep the functional unit busy while still maintaining proper separation of operations targeting the same address. Note that this will only happen for operations which use the register file as two operation targeting the same address in cache cause the second to block at the cache (or be put in the set-aside buffer).

Coping with Multiple Processor Links.

When multiple links to the host processor are used, there are specific ordering issues that arise. Specifically, two updates to a single target location must not traverse two different host processor links unless those links provide ordering guarantees between them. To avoid this scenario, the target address on the host should be used to select a link to the processor based on a hash function or even simple striping.

Methods of the Invention.

The environment for the proposed atomic unit (i.e., the surrounding hardware and software) is expected to provide addressing. That is, atomic operations arriving from the network must be translated to addresses that are appropriate for the atomic unit to use. Similarly, the addresses used by the atomic unit to access to host memory must be translated properly to physical addresses in the processes address space. There are several ways in which this could happen with three examples described below.

Scheme 1: Full Translation Before Atomic Unit.

In this embodiment, atomic operations from the network are translated into true host physical addresses before entering the atomic unit. The atomic unit caches physical addresses and accesses host memory using physical address. Since virtual to physical address translation is typically the last operation performed before performing an access to host memory from the NIC, this would place the atomic unit in an awkward place in the overall pipeline.

Scheme 2: Partial Translation Before Atomic Unit.

In this embodiment, an atomic operation from the network is translated into a process identifier combined with a virtual address. This combination becomes the tag for a cache within the atomic unit. Accesses from the atomic unit must then go through further translation before accessing host memory. This scheme places the atomic unit at a more natural place within the overall pipeline, but has the disadvantage of having potential aliases in the cache (two virtual addresses from two different process address spaces could refer to the same physical location).

Scheme 3: Separation of Atomic Unit and Cache.

FIG. 1 shows the combination of the atomic functional unit and associated cache. This need not be the case. Instead, the atomic functional unit could receive operations targeting virtual addresses associated with a process id and make an appropriate request from the cache. An intermediate element could then translate into a physical address for the cache, which would reside closer to the actual bus control unit. While this would place the pieces in more typical positions (i.e., something that looks much more like a processor translation hierarchy), it would have the disadvantage of increasing the round trip time between the atomic unit and its associated cache logic. This may not be particularly detrimental as the atomic unit may have many operations that it can keep in flight simultaneously.

Software Considerations.

In general, the atomic unit of the invention still requires that the atomic variables only be accessed through the network interface (where the atomic unit and cache reside). It does, however, eliminate the need for explicit flushes of the cache or the tuning of time-outs by making the cache write-through while retaining the benefit of reduced bandwidth requirements.

Although previous efforts have developed schemes for caching addresses associated with atomic operations on the NIC, those schemes have significant flaws in both the timeliness of updates to the host and the way host traffic demands increase (when they should decrease) under load. The mechanisms presented here improve the timeliness of host updates. At the lower bound, they present more traffic to the host interface, but this traffic actually decreases under load in common operating scenarios (unlike previous schemes). Performance tests of the invention confirming its advantages are provided in K. D. Underwood, et al., "High Message Rate, NIC-Based Atomics: Design and Performance Considerations", IEEE Cluster 2008 (September 2008).

Although the invention has been described in detail with particular reference to these preferred embodiments, other embodiments can achieve the same results. Variations and modifications of the present invention will be obvious to those skilled in the art and it is intended to cover in the appended claims all such modifications and equivalents. The entire disclosures of all references, applications, patents, and publications cited above are hereby incorporated by reference.

What is claimed is:

1. A network interface controller (NIC) that is in communication with a host processor in a computing device, the NIC comprising:
an atomic operation unit in the NIC that is configured to execute atomic operations in response to receipt of respective requests from nodes that transmit the requests to the NIC over a network, the atomic operation unit comprising:
a write-through cache that is configured to receive data and immediately propagate the data to a corresponding location in memory of the host processor; and
a rate-limiting functional unit that is configured to execute the atomic operations and write data to the write-through cache based upon the atomic operations, the atomic operations comprise:
a first atomic operation received from a first node, the first atomic operation comprises a first update to a variable; and
a second atomic operation received from a second node, the second atomic operation comprises a second update to the variable, the first atomic operation received at the NIC prior to the second atomic operation, the second atomic operation included in a look-ahead window of network requests, the rate-limiting functional unit writes the first update to a register file while refraining from writing the first update to the write-through cache based upon the second atomic operation being included in the look-ahead window, and wherein the rate-limiting functional unit writes the second update to the write-through cache based upon the first update in the register file.

2. The NIC of claim 1 wherein said rate-limiting functional unit additionally comprises:
an issue unit that reviews the look-ahead window in response to the NIC receiving requests; and
an arithmetic logical unit receiving requests from said issue unit.

3. The NIC of claim 2 wherein said rate-limiting functional unit additionally comprises a register file in two-way communication with said arithmetic logic unit.

4. The NIC of claim 2 wherein said issue unit comprises an in-flight queue.

5. The NIC of claim 1 additionally comprising a rate-absorbing queue between said write-through cache and the host processor.

6. The NIC of claim 5, wherein said rate-absorbing queue comprises a plurality of associative memory cells each comprising a valid bit.

7. The NIC of claim 5 additionally comprising a queue receiving read requests from said write-through cache, and wherein write requests from said write-through cache are provided to said rate-absorbing queue.

8. The NIC of claim 7 additionally comprising a buffer between said write-through cache and said rate-absorbing queue.

9. The NIC of claim 7 additionally comprising a buffer between said write-through cache and the host processor, and wherein said buffer makes flush requests to a local bus interface unit of the host processor.

10. A method executed by a network interface controller (NIC) of a host node in a distributed computing environment, the NIC in communication with a host processor of the host node, the method comprising:
    in an atomic operation unit located in the NIC:
        receiving a first request from a first node in the distributed computing environment, the first request comprises a first atomic operation that is configured to update a variable maintained by the host node;
        receiving a second request from a second node in the distributed computing environment, the second request comprises a second atomic operation that is also configured to update the variable, the first request is received at the NIC prior to the second request;
        based upon the second request being included in a look-ahead window, writing an update to the variable to a register file of the atomic operation unit while refraining from writing the update to the variable to a write-through cache of the atomic operation unit, the update to the variable generated by executing the first atomic operation;
        subsequent to writing the update to the variable to the register file, executing the second atomic operation, wherein output of the second atomic operation is written to the write-through cache, the write-through cache immediately propagates the output to a corresponding location in a memory of the host processor of the host node.

11. The method of claim 10 wherein the atomic operation unit additionally employs an arithmetic logical unit receiving requests from an issue unit, the issue unit reviews the look-ahead window prior to the atomic operation unit executing the first atomic operation.

12. The method of claim 11, wherein the register file is in a two-way communication with the arithmetic logical unit.

13. The method of claim 10 wherein an issue unit reviews the look-ahead window prior to the atomic operation unit executing the first atomic operation, the issue unit comprises an in-flight queue.

14. The method of claim 10 additionally comprising using a rate-absorbing queue between the write-through cache and the host processor.

15. The method of claim 14 wherein the rate-absorbing queue employs a plurality of associate memory cells each comprising a valid bit.

16. The method of claim 14 additionally comprising employing a queue receiving read requests from the write-through cache, and wherein write requests from the write-through cache are provided to the rate-absorbing queue.

17. The method of claim 16 additionally comprising employing a buffer between the write-through cache and the queues.

18. The method of claim 16 additionally comprising employing a buffer between the write-through cache and the host processor, and wherein the buffer makes flush requests to a local bus interface unit of the host processor.

* * * * *